US009189547B2

(12) United States Patent  
Feng et al.

(10) Patent No.: US 9,189,547 B2
(45) Date of Patent: Nov. 17, 2015

(54) METHOD AND APPARATUS FOR PRESENTING A SEARCH UTILITY IN AN EMBEDDED VIDEO

(75) Inventors: Eric I. Feng, Marina del Rey, CA (US); Hua Zheng, Beijing (CN)

(73) Assignee: HULU, LLC, Santa Monica, CA (US)

( * ) Notice: Subject to any disclaimer, the term of this patent is extended or adjusted under 35 U.S.C. 154(b) by 887 days.

(21) Appl. No.: 12/463,997

(22) Filed: May 11, 2009

(65) Prior Publication Data

US 2010/0287474 A1  Nov. 11, 2010

(51) Int. Cl.
G06F 17/30 (2006.01)
G06F 7/00 (2006.01)
G06Q 30/02 (2012.01)
G06F 17/00 (2006.01)

(52) U.S. Cl.
CPC .... *G06F 17/30817* (2013.01); *G06F 17/30554* (2013.01); *G06F 17/30769* (2013.01); *G06F 17/30837* (2013.01); *G06Q 30/02* (2013.01)

(58) Field of Classification Search
CPC .................... G06F 17/30554; G06F 17/30769; G06F 17/30837
USPC .............................. 707/712, 999.001–999.005
See application file for complete search history.

(56) References Cited

U.S. PATENT DOCUMENTS

| | | | |
|---|---|---|---|
| 5,832,494 A | 11/1998 | Egger et al. | |
| 5,889,506 A | 3/1999 | Lopresti et al. | |
| 6,199,082 B1 | 3/2001 | Ferrel et al. | |
| 6,725,275 B2 * | 4/2004 | Eyal | 709/231 |
| 2002/0104096 A1 | 8/2002 | Cramer et al. | |
| 2003/0137542 A1 * | 7/2003 | Zimmerman et al. | 345/764 |
| 2004/0045040 A1 * | 3/2004 | Hayward | 725/135 |
| 2004/0071453 A1 | 4/2004 | Valderas | |
| 2004/0080528 A1 | 4/2004 | Rand et al. | |
| 2004/0088328 A1 * | 5/2004 | Cook et al. | 707/104.1 |

(Continued)

FOREIGN PATENT DOCUMENTS

| | | |
|---|---|---|
| EP | 1197020 | 11/2007 |
| GB | 2323489 | 9/1998 |
| GB | 2443959 | 5/2008 |
| WO | 00/58940 | 10/2000 |

(Continued)

OTHER PUBLICATIONS

"Gotuit and Pixsy Raise the Bar on Video Search," http://www.gotuit.com/press/2008/0930_Pixsy.html, 3 pages.

(Continued)

*Primary Examiner* — Kannan Shanmugasundaram
(74) *Attorney, Agent, or Firm* — Fountainhead Law Group PC

(57) ABSTRACT

A method, apparatus and article of manufacture for providing advertisements into a streamed media program is disclosed. In one embodiment, the method comprises the steps of transmitting a webpage to a user computer, wherein the webpage includes instructions comprising instructions for embedding a media program player in the webpage, wherein the embedded media program player comprises an embedded search utility for accepting a textual user query, receiving a search query from the user computer in a media server, the search query entered into the embedded search utility, generating search results responsive to the user search query, transmitting the search results to the media program player embedded in the webpage, rendering the search results using the media program player; and displaying the rendered search results to the user.

15 Claims, 10 Drawing Sheets

(56) References Cited

U.S. PATENT DOCUMENTS

| | | | |
|---|---|---|---|
| 2004/0268413 A1 | 12/2004 | Reid et al. | |
| 2005/0193015 A1 | 9/2005 | Logston et al. | |
| 2006/0004771 A1* | 1/2006 | Enenkiel | 707/10 |
| 2006/0085476 A1* | 4/2006 | Daniels et al. | 707/104.1 |
| 2006/0190808 A1 | 8/2006 | Balthaser | |
| 2006/0259589 A1* | 11/2006 | Lerman et al. | 709/219 |
| 2007/0146812 A1* | 6/2007 | Lawton | 358/452 |
| 2007/0244900 A1 | 10/2007 | Hopkins et al. | |
| 2008/0060001 A1 | 3/2008 | Logan et al. | |
| 2008/0066107 A1 | 3/2008 | Moonka et al. | |
| 2008/0189617 A1* | 8/2008 | Covell et al. | 715/738 |
| 2008/0279349 A1* | 11/2008 | Jaffe et al. | 379/88.14 |
| 2009/0024927 A1 | 1/2009 | Schrock et al. | |
| 2009/0259647 A1* | 10/2009 | Curtis | 707/5 |
| 2010/0082585 A1 | 4/2010 | Barsook et al. | |
| 2010/0082604 A1 | 4/2010 | Gutt et al. | |

FOREIGN PATENT DOCUMENTS

| | | |
|---|---|---|
| WO | 2005/001656 | 1/2005 |
| WO | 2005/003899 | 1/2005 |
| WO | 2007/030621 | 3/2007 |
| WO | 2007/030751 | 3/2007 |
| WO | 2007/130472 | 11/2007 |
| WO | 2008/011091 | 1/2008 |

OTHER PUBLICATIONS

"Gotuit Announces Integration with DoubleClick," http://www.gotuit.com/press/2008/1022_DoubleClick.html, 1 page.

"Gotuit Publishes White Paper: 'The Currency of Internet Video,'" http://www.gotuit.com/press/2008/1028_Whitepaper_CurrencyOfInternetVideo.html, 1 page.

"The Currency of Internet Video: The Importance of Quality Metadata in Monetizing Internet Video," Gotuit White Paper, Oct. 2008, pp. 1-13.

* cited by examiner

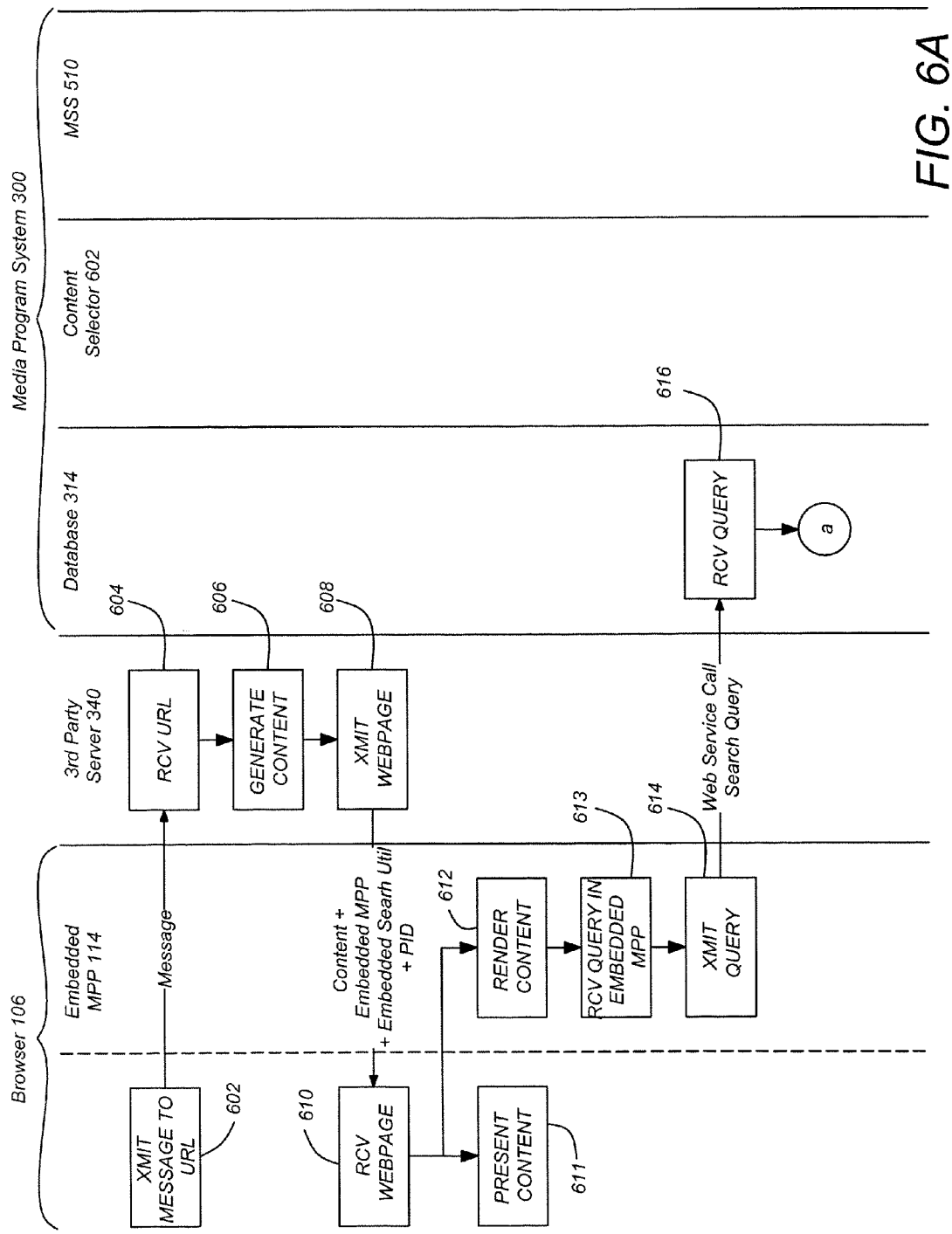

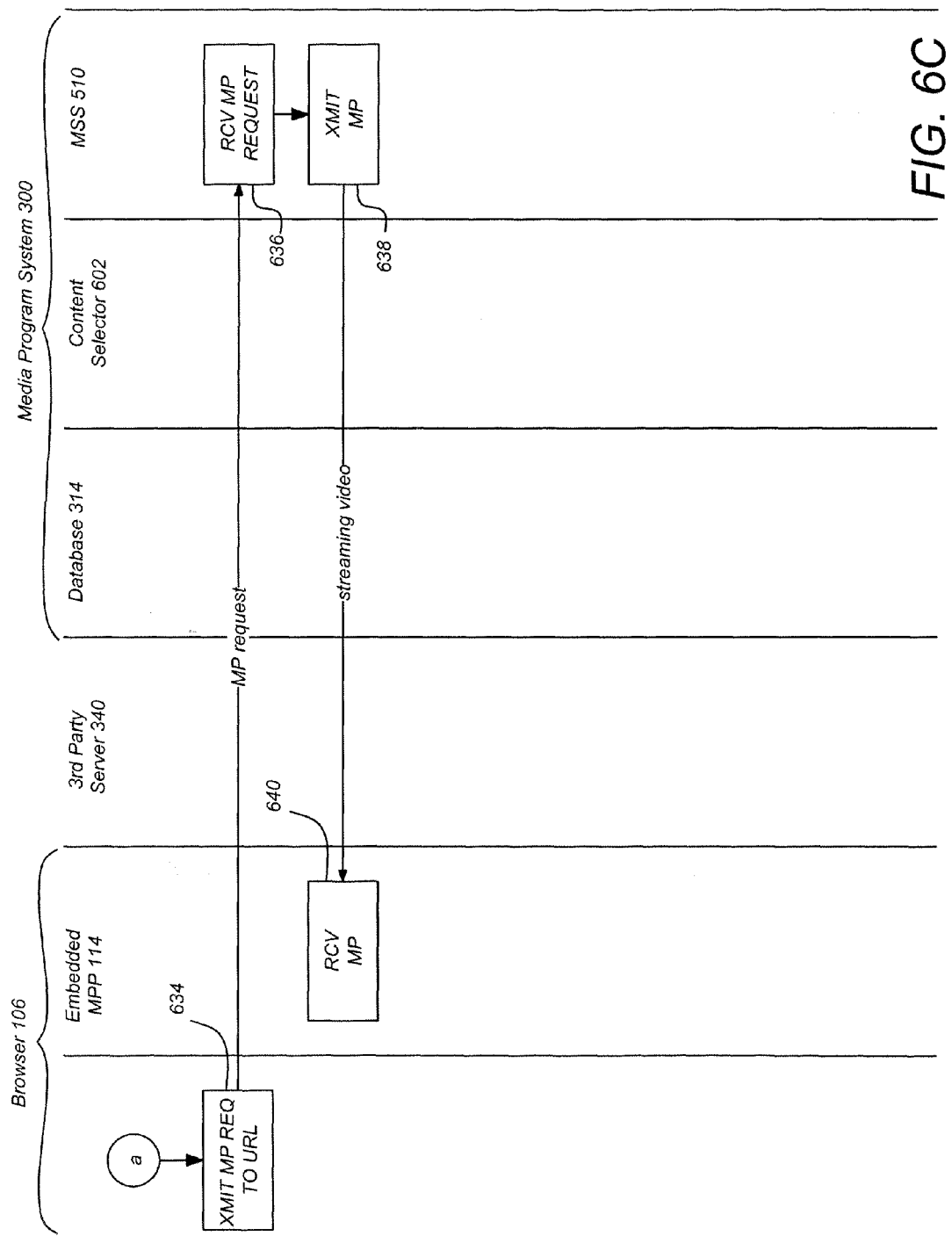

METHOD AND APPARATUS FOR PRESENTING A SEARCH UTILITY IN AN EMBEDDED VIDEO

BACKGROUND OF THE INVENTION

1. Field of the Invention

The present invention relates to systems and methods for providing streaming media to users, and in particular, to a system and method for presenting a search utility in embedded video.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially and consecutively until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and is also often choppy and/or contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

Streaming media and progressive downloading allows the media to be played back via media players that can be embedded in the web pages of third parties. For example, a first entity such as search portal GOOGLE (www.google.com) may embed a media player in one of their hosted webpages that is provided in response to a search query. Or, a commercial entity such as AMAZON (www.amazon.com) may embed a media player in one of their hosted webpages. Or, a blogger may embed a media program player to playback a video of interest to the readers.

FIG. 1 is a diagram of an exemplary browser 106 presenting a webpage 103 of a blog. In the illustrated embodiment, the browser 106 includes an address input region 102, a search query input region 104, and a search button 105. The browser may also include a scroll handle 108, which, by use of a mouse and associated pointer 116 can be selected and moved throughout the scroll region 110 to view a webpage too large to depict in the browser at one time. The blog includes an embedded media player 114, and blog text 104. Typically, the media program that is to be played by the embedded media player is provided by a third party. That is, it is not provided by the blogger or the website hosting the blog.

If the viewer of the blog is intrigued at the content of the media program player 114, they can perform a web search by entering a search query of interest into the search entry input region 104 and selecting the search button 105. In the illustrated embodiment, the user has entered the search query "show me a window" and selected the search button 105.

FIG. 2 is a diagram illustrating the probable result from an entered search query. The initial webpage 103 is no longer shown, and webpage 202 is shown in its place. Webpage 202 includes a second search query input region 202 and search button 204 that can be used to execute another search. The webpage 202 also includes search results for "show me a window" which includes a plurality of search results 206-212 responsive to the search request. The search results 206-212 include a first search result 206 which includes a thumbnail 206A and a hyperlink 206B to the media program depicted in the thumbnail 206A. Similar thumbnails 208A-212A are associated with hyperlinks 208B-212B. A new media player 214 may also be shown in the new webpage 202.

Noteworthy is the fact that after the user executes the search described above, the user is presented with a new webpage with the results of the search query. As a result, any further benefit to the blogger and the third party that provided the embedded video will be lost, as newly presented webpage 203 diverts the user to other websites. This is undesirable for both the blogger and the provider of the media program revenue, because it negatively affects metrics (e.g. page views and clickthroughs) that drive advertising revenue and the value of the website.

Accordingly, there is a need for a system and method that allows the users viewing webpages with embedded media players to perform additional searches and view the results without being redirected to a different webpage. The present invention satisfies this need.

SUMMARY OF THE INVENTION

To address the requirements described above, a method, apparatus and article of manufacture, for providing search results to a user is disclosed. In one embodiment, the method, comprises the steps of transmitting a webpage to a user computer, wherein the webpage includes instructions comprising instructions for embedding a media program player in the webpage, wherein the embedded media program player comprises an embedded search utility for accepting a textual user query, receiving a search query from the user computer in a media server, the search query entered into the embedded search utility, generating search results responsive to the user search query, transmitting the search results to the media program player embedded in the webpage, rendering the search results using the media program player; and displaying the rendered search results to the user. In another embodiment, the invention is evidenced by an apparatus comprising a media server, having a processor and a memory communicatively coupled to the processor, the memory storing instructions comprising instructions for transmitting a webpage to a user computer, wherein the webpage includes instructions comprising instructions for embedding a media program player in the webpage, wherein the embedded media program player comprises an embedded search utility for accepting a textual user query; for receiving a search query from the user computer in a media server, the search query entered into the embedded search utility, for generating search results responsive to the user search query, and for transmitting the search results to the media program player embedded in the webpage, wherein the user computer comprises a second processor and a second memory coupled to the second processor, the memory storing instructions comprising instructions for rendering the search results using the media program player; and for displaying the rendered search results to the user.

BRIEF DESCRIPTION OF THE DRAWINGS

Referring now to the drawings in which like reference numbers represent corresponding parts throughout:

FIGS. 6A-6C are flowcharts illustrating an improved technique of presenting search results to a user in an embedded media program player;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 3:
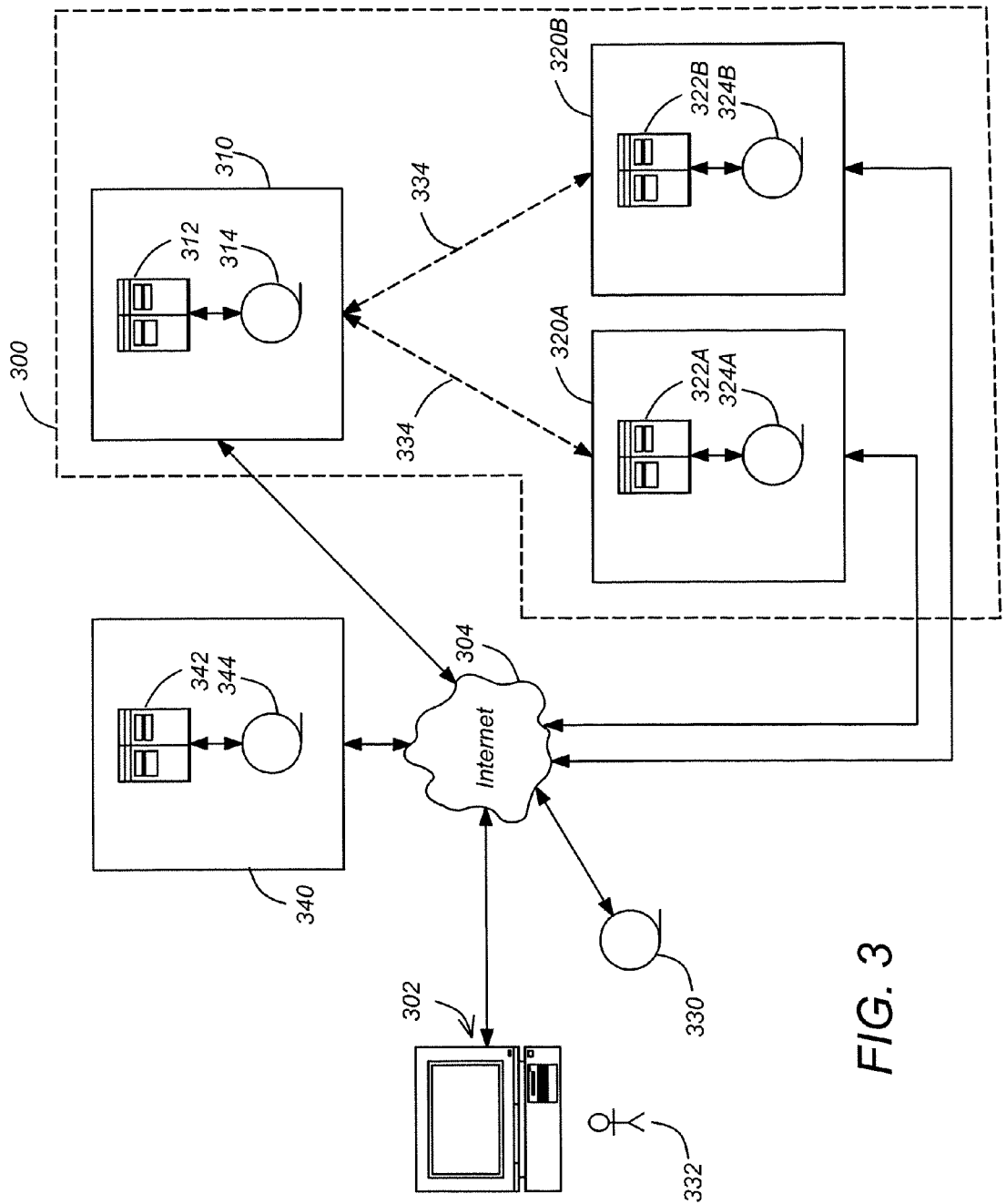
FIG. 3 is a diagram illustrating an exemplary media program system.

FIG. 3 is a diagram illustrating an exemplary media program system 300. In the illustrated embodiment, the system 300 may comprise one or more media program sources 320A, 320B, communicatively coupled to a communication network 304 such as the Internet and each having one or more source video servers 322A, 322B communicatively coupled to one or more source media program databases 324A, 324B. The media program system 300 further comprises and a media program provider 310, communicatively coupled to the communication network 304, and having one or more provider computers 312 and a provider media program database 314. The computers 312 can include one or more media servers, a web server, and any other processing elements necessary to perform the steps and functions described below. In one embodiment, the media program provider 310 is a video-on-demand and/or streaming media program provider.

The media program system 300 may stream media programs to the user's computer 302 directly from the media program provider 310, or the media program provider 310 may operate as a portal, providing an interface to the media programs available from the media program sources 320A and 320B, but not the media program itself (which is instead provided by the media program source 320).

In the first case, the media program provider licenses media programs from the media program sources 320 (such as www.fox.com or www.nbc.com), and metadata for such programs is also typically provided as well. Such metadata is typically adequate (e.g. it need not be supplemented by information from other sources) and can be retrieved by the media program provider's database 314 for use.

In the second case (e.g. when direct streaming is not licensed), the media programs are streamed to the user's computer 302 directly from the servers of the media program source 320. When the media program is streamed directly from the media program source 320, it is often the case that the metadata provided by the media program source 320 is insufficient. In such cases, supplementary metadata may be obtained from an independent media program source 330 (such as www.tv.com or www.imdb.com) or other third party sources. In this circumstance, the role of the media program provider 310 is that of a portal that provides users 332 a list of available media programs and an interface to search to find such programs and to view them.

Media programs and metadata may be obtained via the communication network 304 or through auxiliary (and/or dedicated) communication links 334 by webcrawling (for example, using a program or automated script that browses the World Wide Web in a methodical, automated manner).

Using the computer 302, remote users 332 can communicate with the media program provider 310, to obtain media programs (including video-on-demand and/or streaming video services) and to search the provider media program database 314 to find media programs of interest.

Also using the computer 302, remote users can also transmit and receive information from third party entities 340 communicatively coupled to the Internet. Such third party entities include, for example, search portals (e.g. www.yahoo.com or www.google.com) or servers hosting blogs. In either case, the third party entity 340 may include a server 342 and a database 344.

Figure 4:
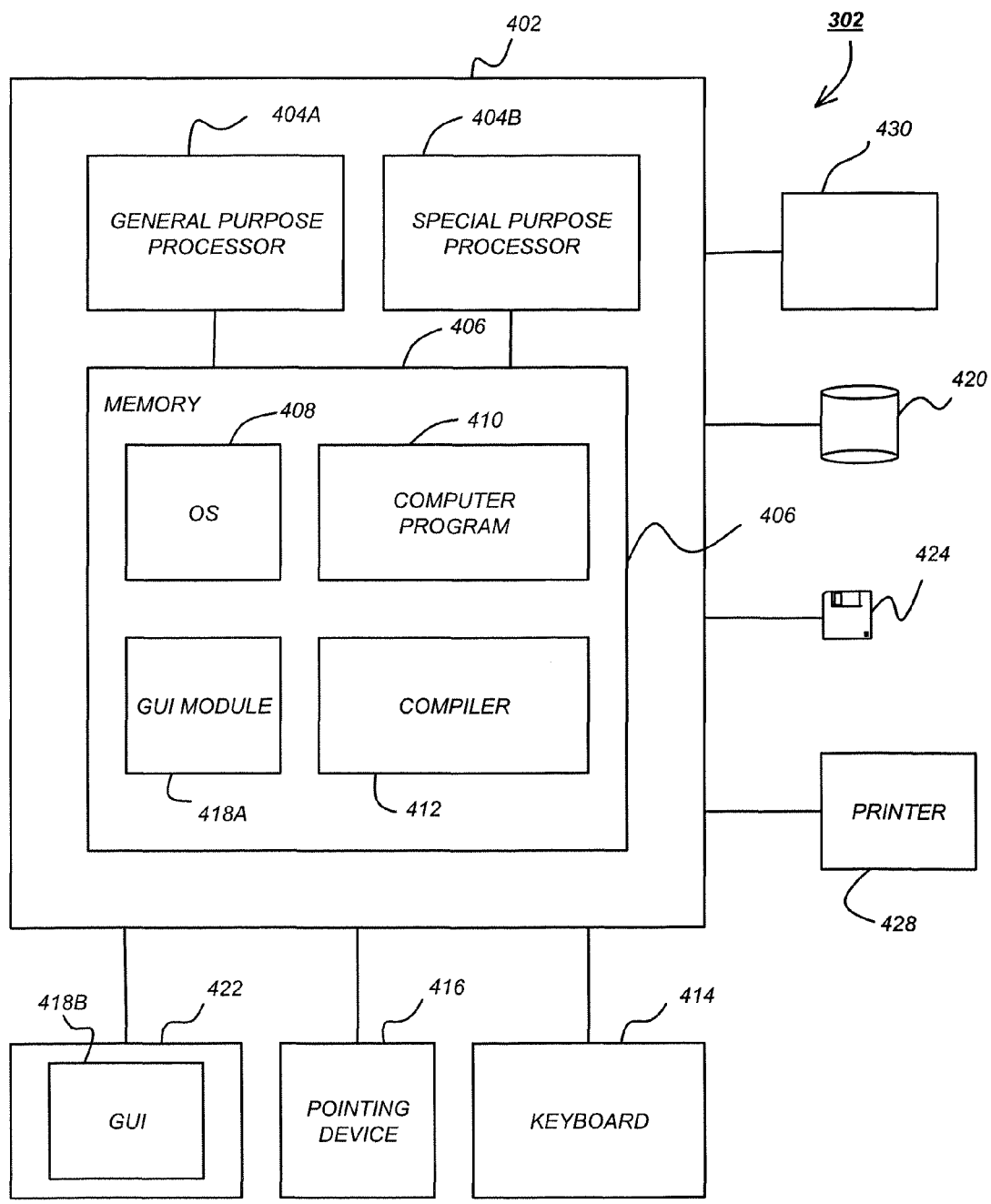
FIG. 4 is a diagram illustrating an exemplary computer system that could be used to implement elements of the present invention.

FIG. 4 is a diagram illustrating an exemplary computer system 402 that could be used to implement elements the present invention, including the user computer 302, servers 312, 322, and 342 and the databases 314, 324, and 344. The computer 402 comprises a general purpose hardware processor 404A and/or a special purpose hardware processor 404B (hereinafter alternatively collectively referred to as processor 404) and a memory 406, such as random access memory (RAM). The computer 402 may be coupled to other devices, including input/output (I/O) devices such as a keyboard 414, a mouse device 416 and a printer 428.

In one embodiment, the computer 402 operates by the general purpose processor 404A performing instructions defined by the computer program 410 under control of an operating system 408. The computer program 410 and/or the operating system 408 may be stored in the memory 406 and may interface with the user 332 and/or other devices to accept input and commands and, based on such input and commands and the instructions defined by the computer program 410 and operating system 408 to provide output and results.

Output/results may be presented on the display 422 or provided to another device for presentation or further processing or action. In one embodiment, the display 422 comprises a liquid crystal display (LCD) having a plurality of separately addressable pixels formed by liquid crystals. Each pixel of the display 422 changes to an opaque or translucent state to form a part of the image on the display in response to the data or information generated by the processor 404 from the application of the instructions of the computer program 410 and/or operating system 408 to the input and commands. Other display 422 types also include picture elements that change state in order to create the image presented on the display 422. The image may be provided through a graphical user interface (GUI) module 418A. Although the GUI module 418A is depicted as a separate module, the instructions performing the GUI functions can be resident or distributed in the operating system 408, the computer program 410, or implemented with special purpose memory and processors.

Some or all of the operations performed by the computer 402 according to the computer program 310 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 402 may also implement a compiler 412 which allows an application program 410 written in a programming language such as COBOL, C++, FORTRAN, or other language to be translated into processor 404 readable code. After completion, the application or computer program 410 accesses and manipulates data accepted from I/O devices and stored in the memory 406 of the computer 402 using the relationships and logic that was generated using the compiler 412.

The computer 402 also optionally comprises an external communication device such as a modem, satellite link, Ethernet card, or other device for accepting input from and providing output to other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of computer program instructions which, when accessed, read and executed by the computer 402, causes the computer 402 to perform the steps necessary to implement and/or use the present invention or to load the program of instructions into a memory, thus creating a special purpose data structure causing the computer to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 402.

Although the term "user computer" is referred to herein, it is understood that a user computer 302 may include portable devices such as cellphones, portable MP3 players, video game consoles, notebook computers, pocket computers, or any other device with suitable processing, communication, and input/output capability.

Figure 5:
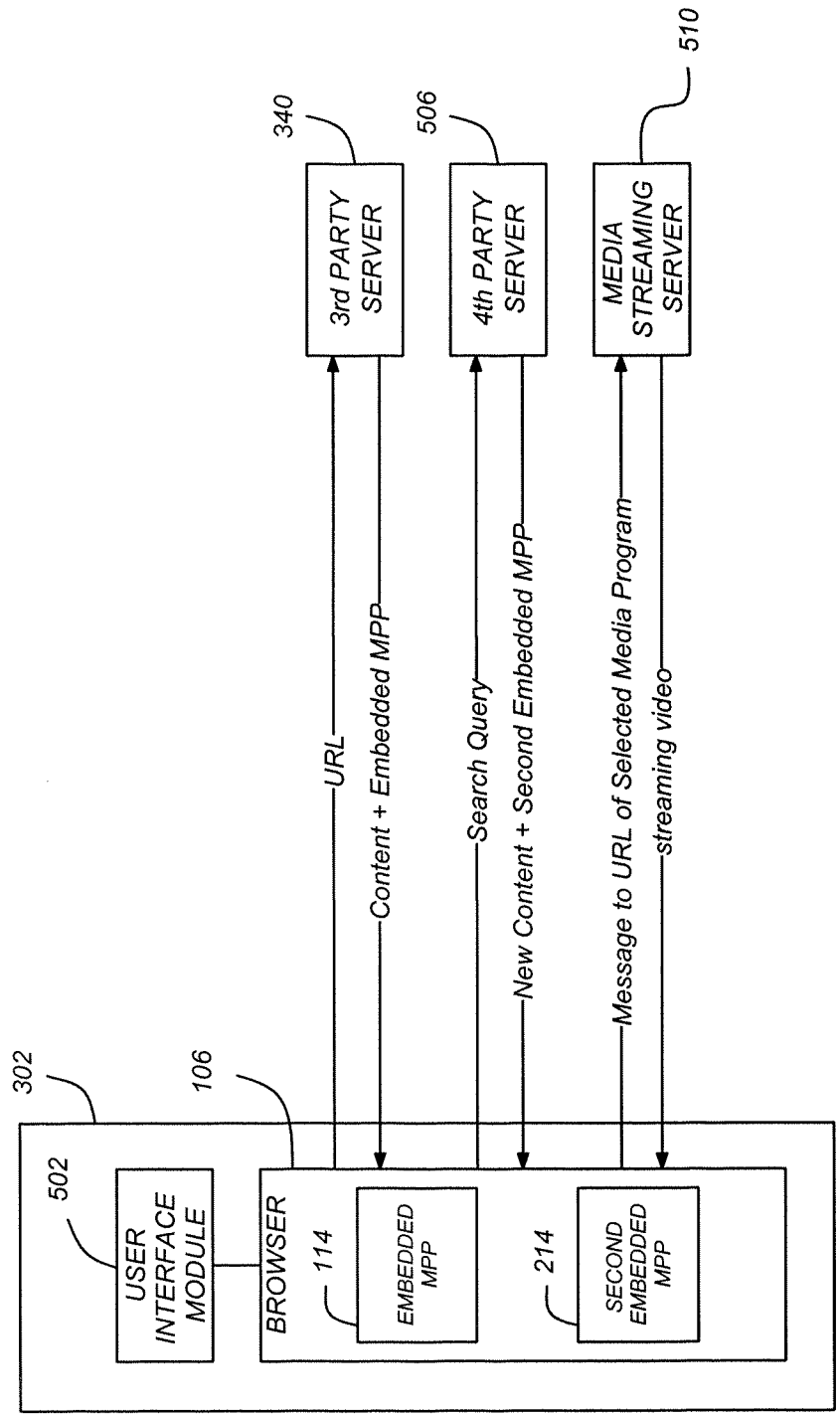
FIG. 5 is a diagram illustrating top-level operations that can be used to deliver media programs and related for presentation to a user computer using the media program system.

FIG. 5 is a diagram illustrating top-level operations that can be used to deliver media programs and related for presentation to a user computer 302 using the media program system 300. The user computer 302 comprises a user interface module 502 that is used to accept input and provide output to the user. The user interface module 502 interfaces with a browser 106 implemented on the user computer 302. The user may enter the uniform resource locator (URL) to a webpage supported by a third party server 340 into the address region 102 of the browser 106. The user computer transmits the URL and the third party server at the URL responds with a webpage. The webpage includes content and may include an embedded media program player (MPP) 114 that can be used to play media programs from within the webpage. This can be accomplished using a browser 106 plug-in. If the MPP 114 is to play a particular media program, the URL associated with that media program may also be returned by the third party server 340.

Figure 1:
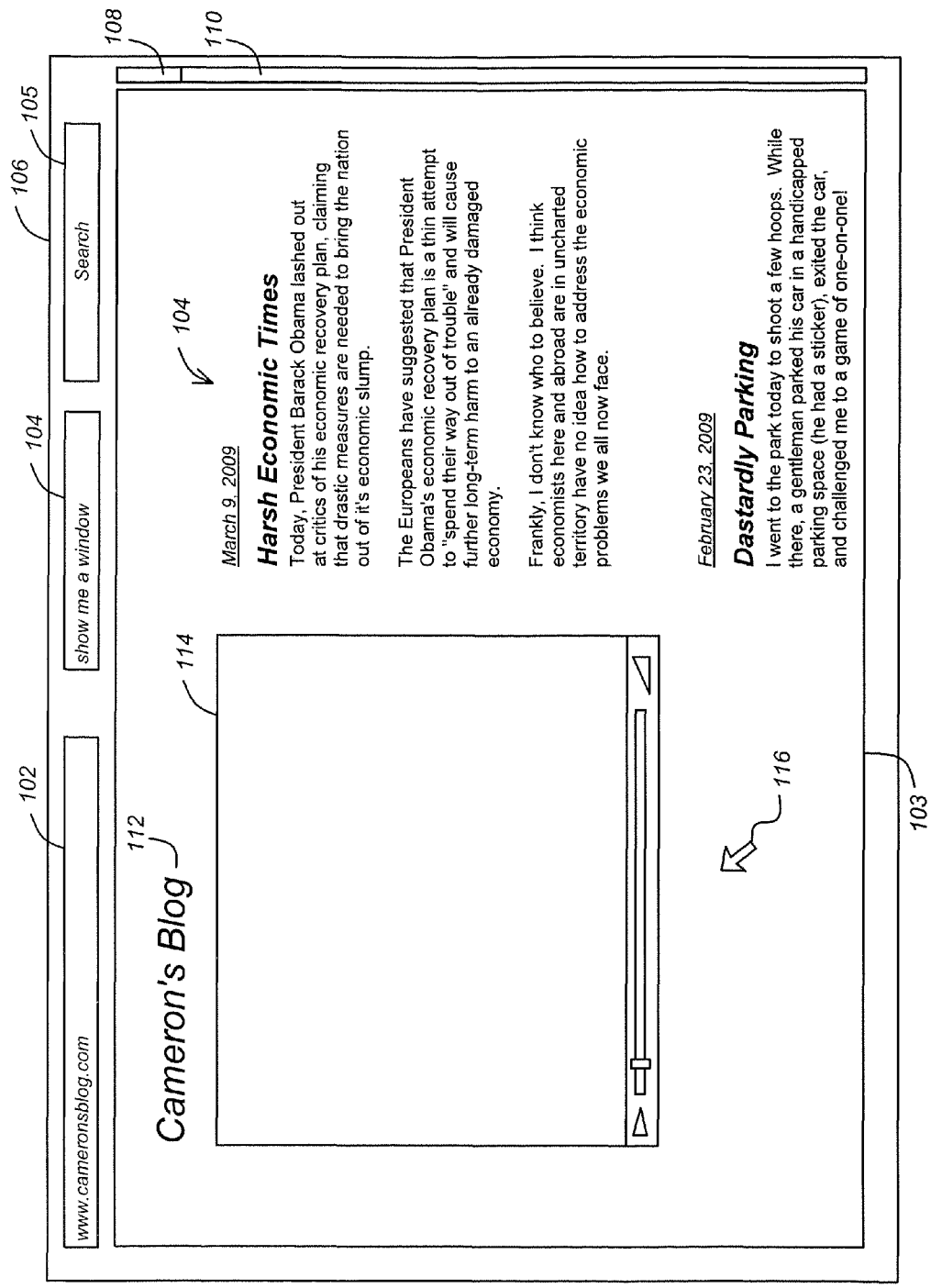
FIG. 1 is a diagram of an exemplary browser presenting a webpage.

An example of the webpage 103 provided by the third party server is shown in FIG. 1, including the content 104 and the embedded MPP 114. The user can then select the play button 118 and begin playing the video. If the media program presented by the MPP 114 generates interest in other media programs, the user can search for additional videos by entering key words into the search box 104 and selecting the "SEARCH" button 105. For example, the user may enter the keyword search terms "show me a window" in the query input region 104 and select the search button 105.

As shown in FIG. 5, the browser 106 then sends a message comprising the search query to a fourth party server 506 such as YAHOO (www.yahoo.com) or GOOGLE (www.google.com). The fourth party server 506 may then transmit new content, which includes a second embedded MPP 214 to the user computer 302 for display on the browser 106.

Figure 2:
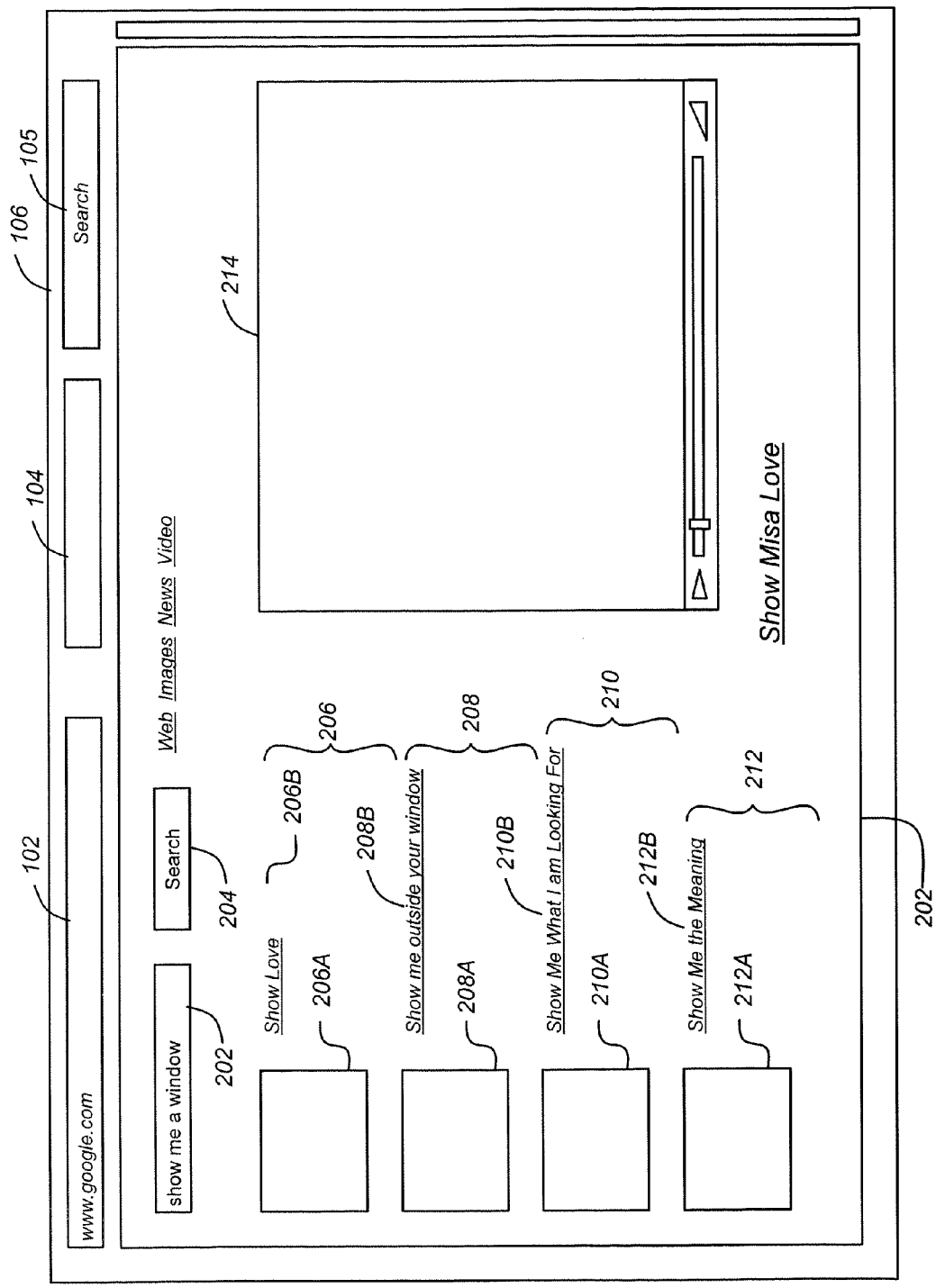
FIG. 2 is a diagram illustrating the probable result from a search query.

FIG. 2 is an example of how the browser 504 may present new contents from the "show me a window" search. The user may select one or more of the other media programs that are responsive to the entered query ("Show Me Love" 206, "Show Me Outside Your Window" 208, "Show Me What I Am Looking For" 210, or "Show Me the Meaning" 212) by selecting the thumbnails or hyperlinks associated with these media programs (206A-212A or 206B-212B, respectively). The browser 106 generates a message that is sent to the URL of the media streaming server (MSS) 510 that hosts the selected media program, and the MSS 510 streams the video to the user computer 302 for presentation by the second 214 embedded MPP 214 in the browser 106.

Note that while the user is presented with candidate media programs that are responsive to the search query, they are re-directed to another website. At this point, the user is less likely to return to the original (blogger's) website. This is disadvantageous, since webvisits and clickthroughs are the metric by which advertising revenue is based. It is also disadvantageous because a new embedded MPP must be loaded into the browser 504 of the user's computer 302. This makes for slower connections because of higher throughput demands, and may cause memory problems and conflicts with the user computer 302. In some cases, for example, the embedded MPP used by the third party server 340 is different than that which is used by the fourth party server 506, in which case, a second embedded MPP must be installed.

Figure 6B:
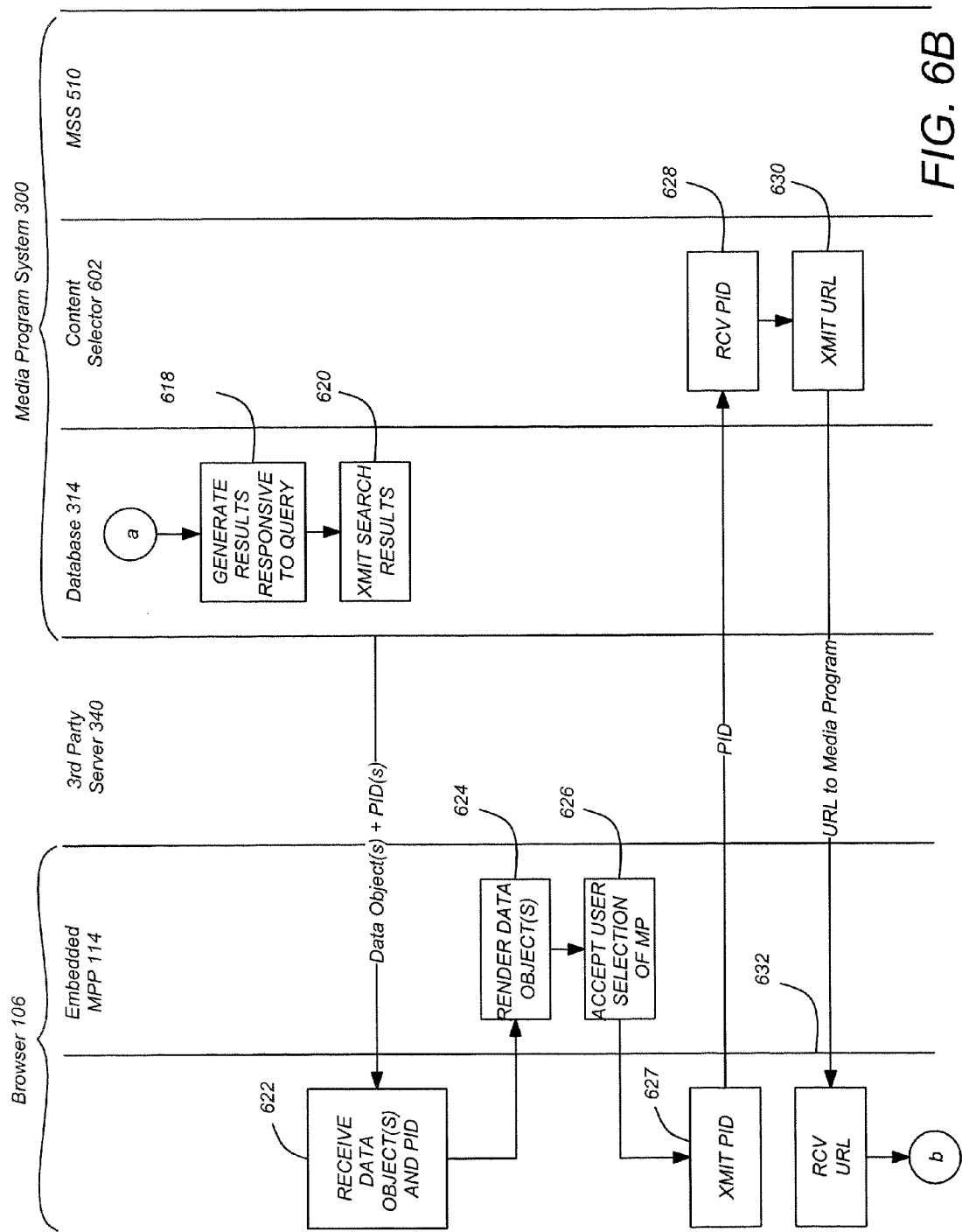

FIGS. 6A-6C are flowcharts illustrating an improved technique of presenting search results to a user in an embedded MPP 114. In block 602, the browser 106 of the user computer 302 transmits a message to the URL of a third party server 340 such as the server hosting a blogger's website. The message is received by the third party server 340, as shown in block 604. The third party server 340 generates the content associated with the URL and transmits a webpage to the browser 106, as shown in blocks 606 and 608. The webpage includes the content (for example, the blog text 104 shown in FIG. 1), and instructions for embedding an MPP 114 in the webpage. The webpage may also include hyperlinks to URLs relevant to the other content presented in the webpage. The webpage may also include one or more program identifiers (PIDs), which identify media programs that are presented in, or referenced to, the webpage. The PID is used to obtain the media program from a media streaming server as further described below. In one embodiment, the embedded MPP 114 also includes an embedded search utility that is rendered by the MPP 114.

The browser 106 presents the content, as shown in block 611. Textual content is presented in the browser, while media program-related content such as flash video is rendered and presented by the embedded MPP 114, as shown in blocks 611 and 612.

Figure 7:
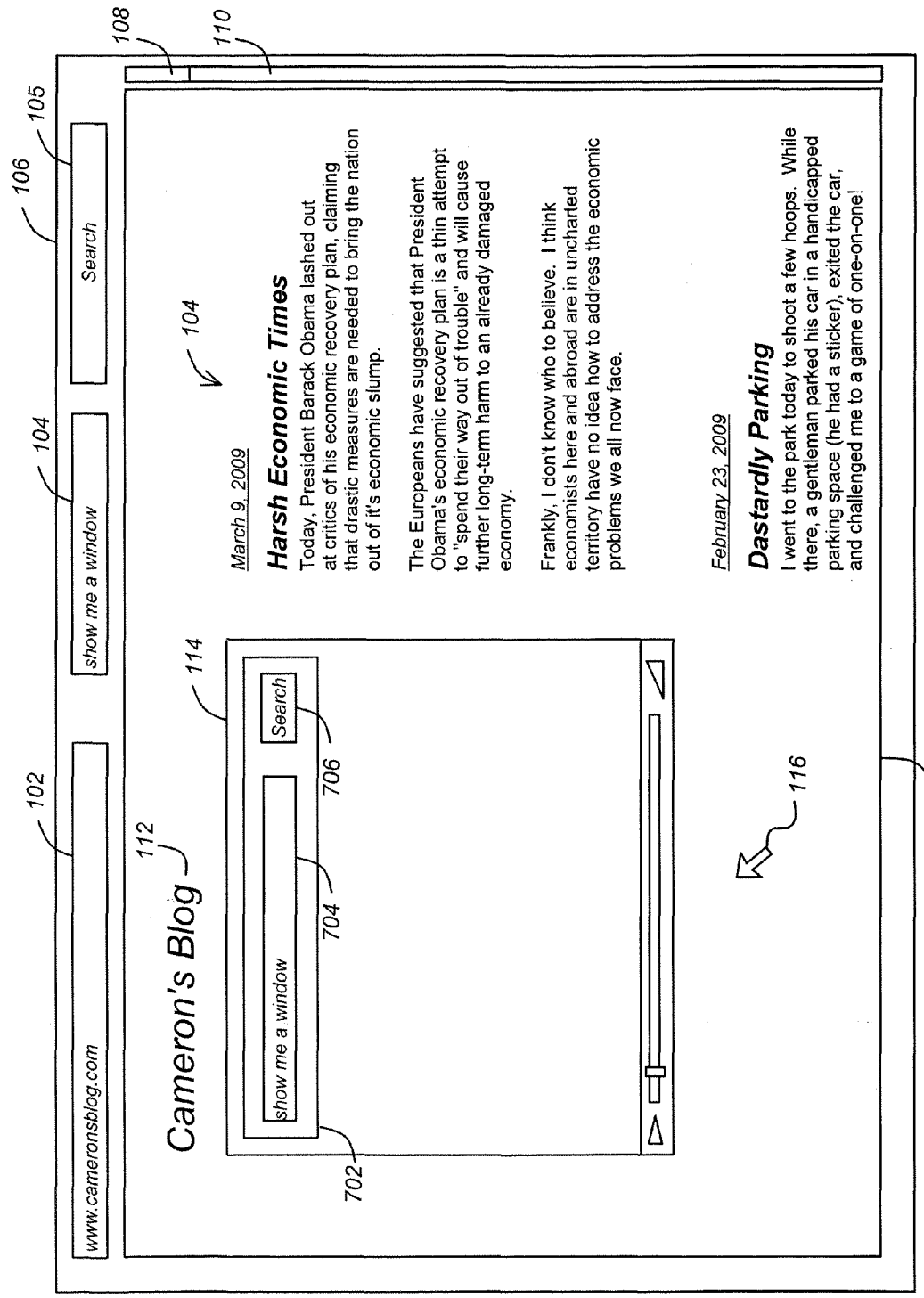
FIG. 7 is a diagram depicting an exemplary webpage having an embedded media program player with an embedded search utility.

FIG. 7 is a diagram depicting an exemplary webpage having an embedded MPP 114 with an embedded search utility 702. The embedded search utility 702 includes an embedded search input region 704 and an embedded search control 706. The embedded search utility can be rendered by the MPP anywhere in the MPP 114 window, or may be only visible based upon other input. For example, the search utility 702 may be invisible until the user passes the cursor 116 over the image of the MPP 114 or until the user depresses one or more keys (for example CTRL-S). The embedded search utility is implemented as a plug-in to the MPP 144 such that it extends the functionality of the MPP 144 to be able to retrieve structured data from a remote source based on input parameters supplied by the end user, and then present that structured data graphically to the end user. The embedded search utility therefore consists of four parts: an input mechanism or module, which accepts parameters (for example, in the form of a search query) from the end user, a request generator module, which contacts a remote source and requests specific information based on the user's search query, a response module, which accepts structured data from the remote source based on the request, and a results module, which implements display functions to render the response back to the end user.

The user may enter a textual search query into the embedded search input region 704, and select the embedded search control 706. The embedded search utility (and hence, the embedded MPP 114) receives the input from the user, and creates web query based on the input provided in the input region 704, as shown in block 612. The query is transmitted by the browser to a database 314 which may be a part of the media program system 300. In one embodiment, this is accomplished via a web service call to the database server 314.

The database server receives the query and generates results responsive to the query, as shown in blocks 616 and 618. In one embodiment, the results comprise data object(s) that describe or illustrate the query results. In block 620, the query results are transmitted to the user 302. In one embodiment, the query results comprise a collection of media programs. In this embodiment, a program identifier (PID) for each of the data object(s) (thus identifying the media programs represented by the data objects) may also be transmitted to the user computer 302 for use in obtaining access to the media programs represented by the data objects, as described further below. In an exemplary embodiment, the data object(s) include the thumbnails and/or a description of the media programs or other data search results generated by the database server 314. In block 622, the data object(s) and PID(s) are received by the user computer 302 and provided to the browser 106. The object(s) are then rendered by the MPP 114, as shown in block 624.

Figure 8:
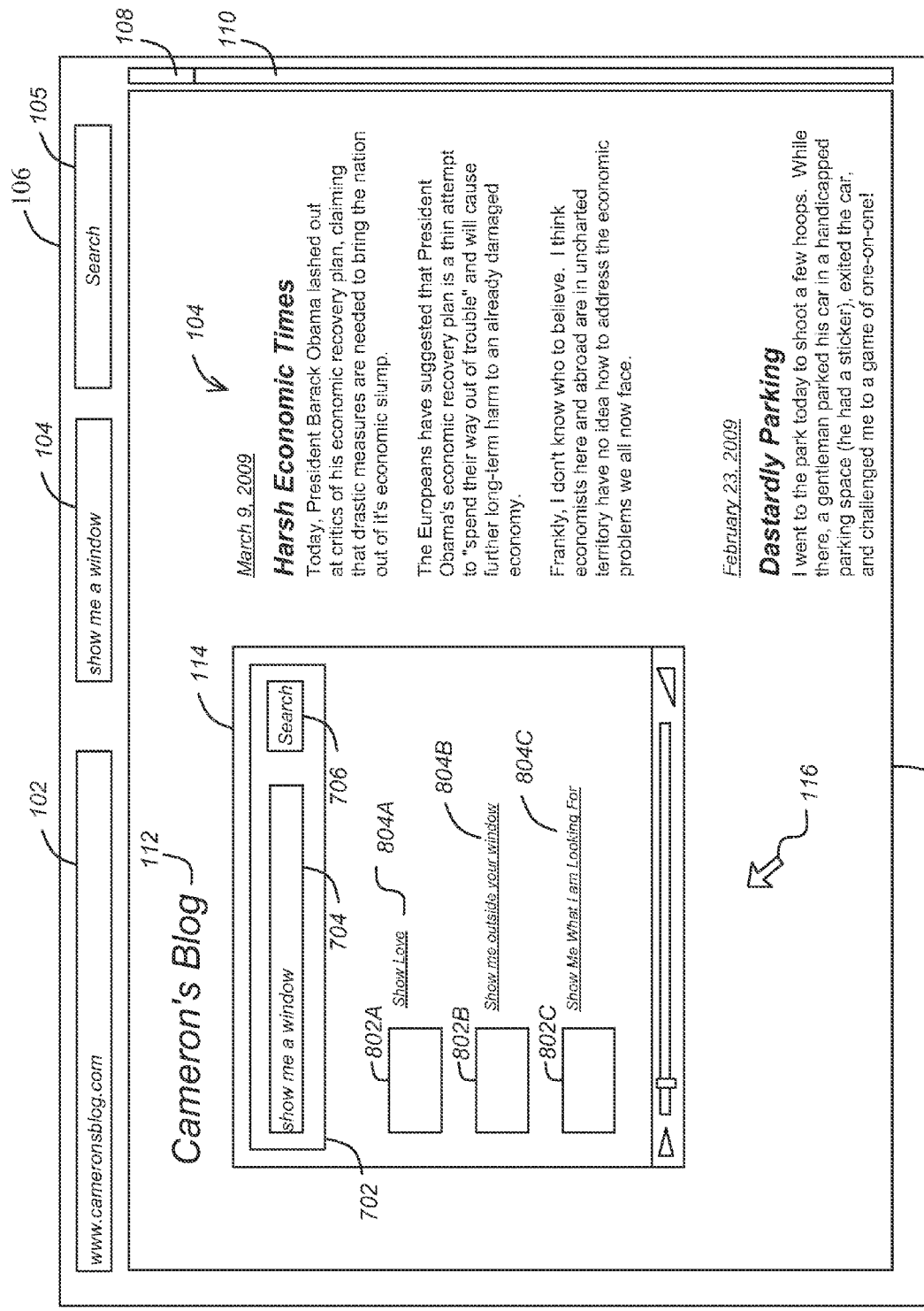
FIG. 8 is a diagram illustrating one embodiment of a media program player rendering objects resulting from a search query.

FIG. 8 is a diagram illustrating one embodiment of the MPP 114 rendering objects resulting from a search query. In the illustrated embodiment, the rendered objects include thumbnails 802A-802C for the media programs that were found in response to the search query, and titled hyperlinks 804A-804C associated with the media programs. The user may then move the pointer 116 to the thumbnail 802 or hyperlink 804 to playback the selected media program.

Returning to FIG. 6B, the embedded MPP 114 accepts the user's selection of a media program. In one embodiment, the thumbnail 802 or hyperlink 804 is directly associated with the URL. In this case, selection of the thumbnail 802 or hyperlink 804 initiates the playback of the selected media program. In another embodiment, each of the depicted objects and hence media programs rendered by the MPP 114 is associated with a program identifier (PID), and when the user selects the thumbnail 802 or the hyperlink 804, the PID for the associated media program is retrieved and transmitted to a content selector 602, as shown in block 627. In one embodiment, the content selector is a hardware or software module of the media program system 300 that associates PIDs with the URL where the media program associated with the PID may be obtained.

The PID is received by the content selector 602, and the URL where the associated media program may be found is generated, looked up, or otherwise obtained. This URL is transmitted to the browser 106, where it is received, as shown in blocks 630 and 632.

Turning to FIG. 6C, the browser transmits a media program request to the MSS 510. In one embodiment, this is accomplished by directing the browser to the received URL. This is illustrated in block 634. The MSS 510 receives the media program request and transmits the media program to the embedded MPP 114, where the media program is received, rendered, and presented to the user.

In one embodiment, before the operations shown in FIGS. 6A-6C are performed, the MSS 300 transmits embedding instructions to the third party server 340. These embedding instruction allow the entity managing the third party server 340 to create the webpage with the embedded MPP 114 that is transmitted to the user computer 302 as illustrated in block 608.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing search results to a user, comprising:
transmitting, from a media program service, instructions for embedding a media program player associated with the media program service in a webpage provided by a third party web server, the instructions being configured for displaying an embedded search utility in the embedded media program player that is configured to play a first media program;
receiving a search query from a user computer, the search query entered into the embedded search utility and including keywords unrelated to the first media program played by the media program player, wherein receiving the search query comprises receiving the search query via a web service call to a media program server associated with the media program service;
generating search results responsive to the user search query using a database associated with the media program service, the search results including media programs offered by the media program service and information that directs a selection of one of the media programs back to the media program service; and
transmitting the search results to the media program player embedded in the webpage for displaying within the embedded media program player, wherein transmitting the search results to the embedded media program player comprises returning a data object including the search results to the embedded media program player, the data object expressed in a programming language in which the embedded media program player can use to display the search results, and wherein the embedded media program player, upon accepting a selection of a second media program in the search results, requests the second media program using the information that directs the selection of one of the media programs back to the media program service and plays the second media program in the embedded media program player that played the first media program.

2. The method of claim 1, further comprising:
receiving a selection of the search results from the user computer, the selection comprising an identifier of the second media program that is used by the media program service to identify the second media program; and
transmitting the second media program to the user computer for playback using the embedded media program player.

3. The method of claim 1, wherein transmitting the instructions comprises:
transmitting the instructions for embedding the media program player to the third party server, wherein the third party server:
receives a request for a webpage;
embeds the media program player in the webpage; and
transmits the webpage from the third party server to the user computer.

4. The method of claim 1, wherein the embedded media program player is a flash player.

5. The method of claim 1, wherein:
the user computer is communicatively coupled to a display including a plurality of pixels and is configured to display the search results to the user by commanding each pixel to a state selected from a group comprising a first state and a second state.

6. An apparatus for providing search results to a user, comprising:
one or more computer processors; and
a non-transitory computer-readable storage medium comprising instructions, that when executed, control the one or more computer processors to be configured for:
transmitting, from a media program service, instructions for embedding a media program player associated with the media program service in a webpage provided by a third party web server, the instructions being configured for displaying an embedded search utility in the embedded media program player that is configured to play a first media program;
receiving a search query from a user computer, the search query entered into the embedded search utility and including keywords unrelated to the first media program played by the media program player, wherein receiving the search query comprises receiving the search query via a web service call to a media program server associated with the media program service;
generating search results responsive to the user search query using a database associated with the media program service, the search results including media programs offered by the media program service and information that directs a selection of one of the media programs back to the media program service; and
transmitting the search results to the media program player embedded in the webpage for displaying within the embedded media program player, wherein transmitting the search results to the embedded media program player comprises returning a data object including the search results to the embedded media program player, the data object expressed in a programming language in which the embedded media program player can use to display the search results, and wherein the embedded media program player, upon accepting a selection of a second media program in the search results, requests the second media program using the information that directs the selection of one of the media programs back to the media program service and plays the second media program in the embedded media program player that played the first media program.

7. The apparatus of claim 6, wherein:
a selection of the search results is received from the user computer, the selection comprising an identifier of the second media program that is used by the media program service to identify the second media program; and
the media program service causes transmission of the second media program to the user computer for playback using the embedded media program player.

8. The apparatus of claim 6, is further configured for:
transmitting the instructions for embedding the media program player to the third party server, wherein the third party server:
receives a request for the webpage;
embeds the media program player in the webpage; and
transmits the webpage to the user computer.

9. The apparatus of claim 6, wherein the embedded media program player is a flash player.

10. A system for providing search results to a user, comprising:
a media server, having a processor and a memory communicatively coupled to the processor, the memory storing instructions comprising instructions for:
transmitting instructions for embedding a media program player associated with the media program service in a webpage provided by a third party web server, the instructions being configured for displaying an embedded search utility in the embedded media program player that is configured to play a first media program;
receiving a search query from the user computer, the search query entered into the embedded search utility and including keywords unrelated to the first media program played by the media program player, wherein receiving the search query comprises receiving the search query via a web service call to a media program server associated with the media program service;
generating search results responsive to the user search query using a database associated with the media program service, the search results including media programs offered by the media program service and information that directs a selection of one of the media programs back to the media program service; and
transmitting the search results to the media program player embedded in the webpage, wherein transmitting the search results to the embedded media program player comprises returning a data object including the search results to the embedded media program player, the data object expressed in a programming language in which the embedded media program player can use to display the search results;
a user computer comprising a second processor and a second memory coupled to the second processor, the memory storing instructions comprising instructions for:
displaying the search results within the embedded media program player, wherein the embedded media program player, upon accepting a selection of a second media program in the search results, requests the second media program using the information that directs the selection of one of the media programs back to the media program service and plays the second media program in the embedded media program player that played the first media program.

11. The system of claim 10, wherein the user computer further comprises instructions for:
receiving a selection of the second media program in the search results from the media server; and
playing the second media program using the embedded media program player.

12. The system of claim 10, wherein the embedded media program player is a flash player.

13. A non-transitory program storage device, readable by a computer, tangibly embodying at least one program of instructions executable by the computer to perform method steps comprising:
transmitting, from a media program service, instructions for embedding a media program player associated with the media program service in a webpage provided by a third party web server, the instructions being configured for displaying an embedded search utility in the embedded media program player that is configured to play a first media program;
receiving a search query from a user computer, the search query entered into the embedded search utility and including keywords unrelated to the first media program played by the media program player, wherein receiving the search query comprises receiving the search query via a web service call to a media program server associated with the media program service;
generating search results responsive to the user search query using a database associated with the media program service, the search results including media programs offered by the media program service and information that directs a selection of one of the media programs back to the media program service; and
transmitting the search results to the media program player for rendering in the embedded media program player, wherein transmitting the search results to the embedded media program player comprises returning a data object including the search results to the embedded media program player, the data object expressed in a programming language in which the embedded media program player can use to display the search results, and wherein the embedded media program player, upon accepting a selection of a second media program in the search results, requests the second media program using the information that directs the selection of one of the media programs back to the media program service and plays the second media program in the embedded media program player that played the first media program.

14. The non-transitory program storage device of claim 13, wherein the method steps further comprise:
receiving a selection of the rendered search results in the media server from the user computer, the selection comprising an identifier of the second media program that is used by the media program service to identify the second media program; and
transmitting the second media program to the user computer for playback using the embedded media program player.

15. The method of claim 1, further comprising:
transmitting the first media program for playback by the media program player before receiving the search query from the user computer; and
wherein the search query describes a search for media programs other than the first media program.

* * * * *